(12) United States Patent
Hodgkinson et al.

(10) Patent No.: US 9,610,541 B2
(45) Date of Patent: Apr. 4, 2017

(54) METHOD FOR ACCELERATED TESTING OF A MEMBRANE MODULE

(71) Applicant: Central Gippsland Region Water Corporation, Traralgon (AU)

(72) Inventors: Andrew Hodgkinson, Traralgon (AU); James Stanley Kay, Traralgon (AU); Stuart Douglas Harrison, Traralgon (AU)

(73) Assignee: CENTRAL GIPPSLAND REGION WATER CORPORATION, Traralgon, Victoria (AU)

(*) Notice: Subject to any disclaimer, the term of this patent is extended or adjusted under 35 U.S.C. 154(b) by 382 days.

(21) Appl. No.: 14/359,740

(22) PCT Filed: Nov. 26, 2012

(86) PCT No.: PCT/AU2012/001447
§ 371 (c)(1),
(2) Date: May 21, 2014

(87) PCT Pub. No.: WO2013/075177
PCT Pub. Date: May 30, 2013

(65) Prior Publication Data
US 2014/0318219 A1 Oct. 30, 2014

(30) Foreign Application Priority Data
Nov. 25, 2011 (AU) .................... 2011904915

(51) Int. Cl.
*B01D 65/10* (2006.01)
*B01D 65/02* (2006.01)
(Continued)

(52) U.S. Cl.
CPC ............ *B01D 65/10* (2013.01); *B01D 65/02* (2013.01); *B01D 65/104* (2013.01);
(Continued)

(58) Field of Classification Search
CPC .......................... B01D 65/10; C02F 3/1268
See application file for complete search history.

(56) References Cited

U.S. PATENT DOCUMENTS 3,110,667 A * 11/1963 Stuppy .................. B01D 23/18
                                                       210/275
4,473,474 A *  9/1984 Ostreicher ............ A61L 2/0005
                                                       210/636
(Continued)

FOREIGN PATENT DOCUMENTS

EP        0855212 A1     7/1998

*Primary Examiner* — Laura Martin
*Assistant Examiner* — Alex Devito
(74) *Attorney, Agent, or Firm* — Ballard Spahr LLP

(57) ABSTRACT

A method of accelerated testing of a membrane module for resistance to cyclic stress during operation of an industrial membrane separation process comprising loading at least one membrane module into a test cell of a test plant; conducting said industrial membrane separation process while subjecting said membrane module to cyclic stresses during a plurality of membrane operating cycles, each cycle being of significantly lesser duration than used for operation of said industrial membrane separation process in an operating plant; and testing said membrane module for component failure caused by said cyclic stresses.

28 Claims, 4 Drawing Sheets

(51) Int. Cl.
    *C02F 1/44*     (2006.01)
    *C02F 3/12*     (2006.01)
    *C02F 3/28*     (2006.01)
    *C02F 9/00*     (2006.01)

(52) U.S. Cl.
    CPC ...... *B01D 2315/06* (2013.01); *B01D 2321/04* (2013.01); *C02F 1/442* (2013.01); *C02F 1/445* (2013.01); *C02F 3/1268* (2013.01); *C02F 3/28* (2013.01); *C02F 9/00* (2013.01); *C02F 2209/445* (2013.01); *Y02W 10/15* (2015.05)

(56) References Cited

U.S. PATENT DOCUMENTS

| | | | |
|---|---|---|---|
| RE31,952 E * | 7/1985 | Wilcox | G01M 3/20 239/514 |
| 6,463,790 B1 * | 10/2002 | Chun | G01N 15/0826 210/741 |
| 8,336,292 B2 * | 12/2012 | Bloms | F01N 11/00 60/277 |
| 2008/0163698 A1 | 7/2008 | Ogawa et al. | |
| 2013/0043183 A1 * | 2/2013 | Ge | B01D 67/009 210/490 |

* cited by examiner

METHOD FOR ACCELERATED TESTING OF A MEMBRANE MODULE

CROSS REFERENCE TO RELATED APPLICATIONS

This application is a National Phase Application of International patent application No. PCT/AU2012/001447, filed on Nov. 26, 2012, which is based upon and claims priority to Australian patent application No. 2011904915, filed Nov. 25, 2011, each of which are hereby incorporated by reference in their entirety.

This invention relates to a method of accelerated testing of a membrane module.

Membrane processes are commonly used in industry for separating components from fluid mixtures, whether the fluid is in liquid or gaseous form. Membranes of semipermeable material enable separation of components as follows. Some components of the fluid mixture permeate through the membrane, though at different rates. Other components will not pass through the membrane at all. Such components are said to be retained by the membrane.

In the field of water treatment, for example, membrane processes may be used to purify an "effluent" water stream containing water in admixture with contaminant components. Such industrial processes involve membrane separation of the contaminant components from the effluent water, allowing the treated water to be re-used by industry or discharged safely into the environment. An example of such a process, advantageously involving a combination of membrane separation processes (nanofiltration and reverse osmosis) is disclosed in the Applicant's WO 2010037156 "Process and Plant for Treating a Water Stream", the contents of which are hereby incorporated herein by reference. Membrane processes may be used to achieve separation of substances in many applications and process media including water treatment for desalination, filtration and in membrane bioreactors, which are a specialised type of filtration application.

Industrial application of membrane processes such as disclosed in WO 2010037156, requires suitable equipment in the form of membrane modules for which various designs are available: hollow fibre, tubular, spiral wound and—less commonly plate and frame. Hollow fibre membrane modules are often preferred because hollow fibre membranes allow the highest membrane surface area per unit volume of a vessel to accommodate them. A hollow fibre membrane module typically comprises a bundle of the hollow membrane fibres sometimes accommodated within a pressurisable housing or immersed in an open tank configuration. A hollow fibre bundle extends between two opposed headers or "pots" forming part of the module housing and the opposite ends of each hollow fibre are potted and sealed within each "pot", typically of polymer or resin material (particularly epoxy or polyurethane resin), to form a tube sheet. The resulting design is analogous to a shell and tube heat exchanger. The fluid to be treated is contacted with the hollow fibres such that components are separated, with liquid generally passing inwards to the hollow centre of the fibre under the action of a moderate pressure gradient, and the solids remaining outside the fibre.

Membrane separation processes often include a number of such membrane modules operating in parallel. A number of such modules may comprise a rack which is located, either in a pressurised system or submerged in a tank style water treatment cell to which water for treatment has been introduced to remove contaminants from the water, for example in a membrane bioreactor. The water treatment cell is typically agitated by sparging air or other gas through it and or by recirculating a liquid flow through it. Such agitation and or recirculation prevents solids buildup on membrane fibres that would impair membrane treatment performance.

In an industrial plant, such as a waste water treatment plant (but not by any means limited to such plant), the selected membrane modules are likely to have a significant capital cost. At the same time, membrane service life of several years is likely to be required. A constraint on membrane service life is membrane module failure due to repeated cyclic stresses imposed on the hollow fibre membranes and supporting components such as the pots during operation. In normal operation, hollow fibre membranes are subjected to filtration, relaxation and pressure testing cycles. Treated fluid must be extracted from the hollow fibre membranes by means of a pressure differential. This can be by means of suction in the case of submerged fibres, or by pressure difference in pressurised systems. In each case, a pump or source of pressure difference is "on" during a filtration cycle, which applies substantial bending forces and cyclic stresses on the membrane module system, particularly at the pots in which opposed ends of the hollow fibre membranes are sealed. The pots are also likely to be subjected to other cyclic mechanical stresses such as periodic stresses in the reverse or pressurised direction during a pressurisation cycle. Periods when the pump or other source of pressure means is "off" are called relaxation cycles. Such relaxation cycles may have the same duration as filtration cycles or may be much shorter. In water treatment plants, sludge removal operations, or backwashing, may be conducted during relaxation cycles, for example through agitating mixed liquor surrounding the hollow fibre membranes, shaking them to remove sludge.

In addition, pressure integrity testing/pressure decay cycles may be conducted in which the hollow fibre membranes are pressurised with compressed air and dynamic behaviour is observed in order to assess membrane integrity and absence of leaks. Decay or decline in pressure (for example) over a pre-set time provides a direct measure of integrity. Other pressure decay tests can use a vacuum source and observe rate of increase of pressure. In either case, if the decay gradient is too steep, particularly being steeper than a pre-determined gradient consistent with membrane integrity, the membrane has unsatisfactory integrity and is not fit for purpose.

Daily operation of a membrane separation process within a water treatment plant may typically be designed to involve, for example and without any intent of limitation, over one hundred filtration cycles (about 14 minute design cycle time) and one pressurisation cycle per day.

Over a period of time, the continuous imposition of cyclic stresses—possibly in combination with corrosion/degradation caused by chemical agents for example used for disinfection (for example sodium hypochlorite)—can lead to damage to the membrane module, particularly through cracking and fatigue failure. If cracking, particularly at the pots or tubesheets, occurs the membrane module is typically no longer serviceable. This is a very significant failure mode, particularly in membrane bioreactors, which can occur despite the membrane material for the hollow fibres being otherwise correctly selected from the perspective of mechanical properties (see, for example, Childress, A E et al, Mechanical analysis of hollow fibre membrane integrity in water reuse applications, *Desalination* 180 (2005), 5-14). The reason is that separation of fluid to be treated from treated fluid: for example mixed liquor (dirty water) from clean water in the context of water treatment is no longer possible. The membrane module must be discarded.

As alluded to above, it may be several years before a membrane module becomes unserviceable. However, the exact timing of failure (service life) is uncertain and this makes planning and budgeting for a water or wastewater treatment plant difficult. Such uncertainty also impacts selection of a membrane module which is best suited for the membrane separation process. All other factors being equal, the plant designer will select a membrane module having the longest service life. If it takes several years, for example 5 years or more, to determine likely failure time, through statistical analysis, it is very difficult for an optimal selection to be made. Whilst manufacturer and brand provides a guide to membrane module service life, greater certainty is required. The membrane module manufacturer is not in an ideal position to provide an accurate service life prediction (and likely will not provide one). The reason is simple in many cases. The specific operating environment for a particular industrial membrane separation process often cannot be reasonably replicated by a membrane module manufacturer following its usual testing protocols. A real challenge for the membrane module manufacturer is duplicating the often time variant compositional nature, and—to a perhaps lesser extent—properties (such as temperature) of fluids subjected to membrane separation. For example, effluent subjected to membrane separation in a water treatment plant often has a highly dynamic, that is time and/or seasonally variant, composition and flow rate. Properties such as temperature may also vary with time and the nature of the effluent being treated by the water treatment plant. Membrane module service life predictions based on tests using sample, or synthetic, effluents of near-static or near-constant composition is simply not sufficiently accurate for budgeting purposes.

It is an object of the present invention to provide greater accuracy of prediction of membrane module service life than currently available.

With this object in view, the present invention provides a method for accelerated testing of a membrane module for resistance to cyclic stresses during operation of an industrial membrane separation process comprising loading at least one membrane module into a test cell of a test plant; conducting said membrane separation process while subjecting said membrane module to cyclic stresses during a plurality of membrane operating cycles, each cycle being of significantly lesser duration than used for operation of said industrial membrane separation process in an operating plant; and testing said membrane module for component failure caused by said cyclic stresses.

Such testing, which may usefully include imposing chemical treatments similar to those used in the industrial membrane separation process (though including testing under more aggressive chemical conditions), allows a mean service life for the membrane module to be predicted, advantageously in a much lesser timeframe than actual service life. Such information may be advantageously employed to assist in membrane module selection and cost budgeting for a membrane separation plant.

The method accelerates membrane module testing because the test cycle duration is significantly shorter than design duration, the duration to be used for membrane operating cycles in the operating plant. Consequently, frequency of membrane operating cycles applied during testing is significantly greater than the design frequency, that is, the frequency at which stress cycles will be applied to the membrane module in normal industrial service. Industrial service is not limited to commercial service. Practice of membrane separation processes as part of a public utility is also included within the scope of industrial service.

Advantageously, the test plant forms part of, or is connected to, an actual operating plant implementing the industrial membrane separation process. This integration of test plant and operating plant enables testing of membrane modules under actual industrial operating conditions, rather than simulated or synthetic conditions in an artificial environment, addressing inaccuracies created by failure to test membrane modules under dynamic compositional, property and flow rate conditions typically encountered in industrial plants. The results of testing are substantially more reliable than tests performed distant from an operating plant implementing said industrial membrane separation process, potentially on bench or very small scale, with fluid samples for membrane processing of near-constant or static quality and rather than time variant quality.

Membrane operating cycles, which are typical and of particular though not limiting importance, may comprise filtration cycles; relaxation cycles; and/or pressure decay testing cycles in which the membranes of the membrane modules are tested for leaks. That is, the membrane modules may only be subjected to filtration and relaxation cycles; or pressure decay testing cycles. Alternatively, membrane modules may be subjected to both filtration and relaxation cycles and pressure decay testing cycles. Filtration cycles correspond with periods when pump means forming part of the test cell are operated, or turned on, to apply pressure (positive or negative) to a membrane. Relaxation cycles correspond with periods when pump means forming part of the test cell are turned off. Membrane cleaning operations, such as backwashing or sludge removal operations, may be conducted during relaxation cycles. These cycles are significantly accelerated over operating plant cycles for test purposes.

The test plant may include a plurality of test cells. In such cases, test cells may be operated in parallel with one test cell imposing different membrane operating cycles and a different cyclic stress regime on membrane modules than in another test cell. Chemical testing, to assess corrosion/degradation phenomena, may also be practised in one or more test cells. Such parallel test cell operation accelerates the collection of test data.

The frequency of filtration and relaxation cycles to which a membrane module is subjected during testing is accelerated to a frequency which would typically be significantly greater than the frequency of any pressure decay/pressure integrity testing cycles used in the operating plant, for example up to and greater than 100 filtration cycles to 1 pressurisation cycle. This can induce significant pressure shocks at pumps and valves which operating plants would normally take steps to prevent (see, for example, Huisman, I H and Williams, K, Autopsy and failure analysis of ultrafiltration membranes from a waste-water treatment system, *Desalination* 165 (2004), 161-164)). The testing method, in contrast, is intended to purposefully induce such pressure shocks to increase testing severity.

The membrane module to be tested conveniently comprises hollow fibre membranes as such membranes are often selected for industrial membrane separation processes for reasons described above. In this case, the membrane module comprises a housing accommodating a bundle of the hollow membrane fibres, each hollow fibre extending between two opposed headers (also known as pots) with the opposite ends of each hollow fibre being potted and sealed within a header, typically of polymeric or resin, such as epoxy or polyurethane resin, material. These pots or headers are critical components of the membrane module. Component failure would be indicated; in particular, when cracking of a pot or adhesion failure between the fibres normally retained in the pot, and the pot, occurred during testing. The membrane module testing method may also be applied to other membrane module types such as tubular, spiral wound and plate and frame membrane module types.

During testing, a plurality or rack of membrane modules may be loaded into the test cell to enable simultaneous testing. The resulting increase in data accelerates prediction of the likely time to failure (i.e. service life) of a membrane module in service. The prediction of likely time to failure should not require any complicated mathematical modeling.

The method may comprise subjecting each membrane module to a testing cycle having a predetermined number of stress cycles to be imposed over a predetermined period of time. The predetermined number of stress cycles may correspond with required minimum service life (typically measured in years) though this number of stress cycles will be imposed in a much shorter period (in the order of weeks or months).

The membrane module testing method may be used for other purposes. During testing, duration of a filtration cycle will be significantly shorter than during normal service. Such extremely short filtration cycles may increase filtration flux over normal service. Filtration flux during testing may thus be measured and compared with filtration flux during normal service.

Alternatively, or additionally, testing may be used to assess whether resistance to membrane fouling is improved by shorter filtration cycle duration.

The membrane module testing method may be used to test membrane modules and predict membrane module service life for a range of different membrane separation processes. However, the testing method is particularly advantageous for industrial processes in which typical required membrane service life has a duration of a plurality of years.

Liquid treatment processes, especially water treatment processes, are a particularly important example of this category of processes since membrane separation processes are widely used for separation of contaminants from water. In addition, membrane modules for use in large volume water treatment plants have a typically high capital cost. The testing method is especially suitable for testing membrane modules to be used in membrane bioreactors, especially under submerged conditions. For testing this application, test cell(s) are configured to simulate membrane bioreactor (s) and membrane modules, typically comprising hollow fibre membranes are submerged in mixed liquor in the test cell(s).

The testing method may be applied to any waste water treatment processes including those where a membrane module will be subjected to a temperature greater than about 25° C., or even greater than 30° C. and approaching 40° C. At such temperatures, which may particularly be encountered with effluent water streams containing effluent from an industrial process, membrane module operating temperature may be greater than the glass transition temperature of the polymer or resin material of the headers of the membrane modules. Thus the testing method may be applied at different temperatures to assess dependence of service life on service operating temperature.

Testing severity may also be increased by imposing various chemical treatments, such as sodium hypochlorite solutions typically used as disinfectants in water treatment processes, at a plurality of solution strengths, for varying durations so as to simulate the type of chemical attack and associated degradation that might occur during normal use over a period of years. Such chemical treatments could also be imposed where the membrane operating cycle duration is the same as, or similar to, duration used in the operating plant.

An embodiment of the method of accelerated testing of a membrane module in accordance with the present invention will now be described with reference to the accompanying figures in which.

Figure 1:
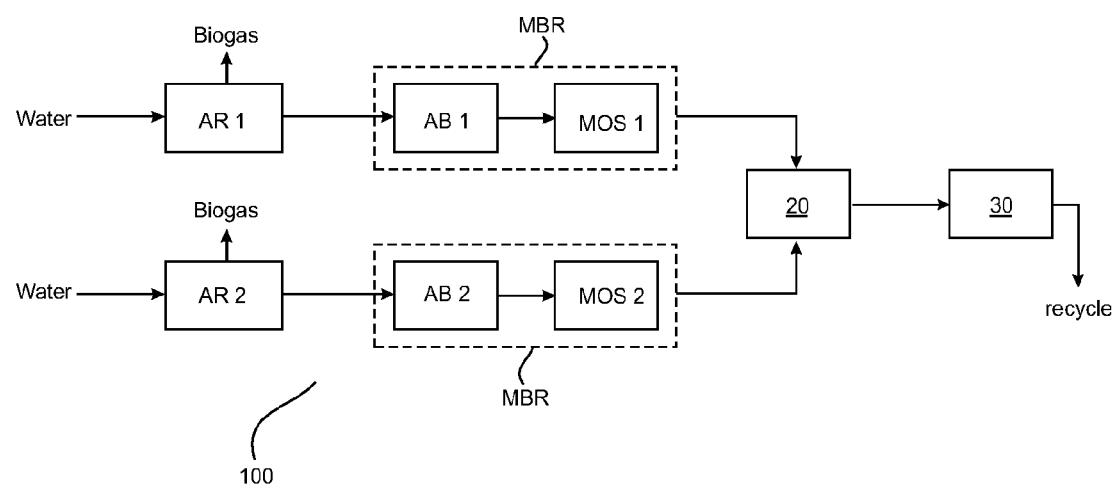
FIG. 1 is a schematic process flowsheet for a water treatment plant including a membrane module of type to be tested in accordance with the method of testing of the invention.

Referring now to FIG. 1, there is shown a water treatment plant 100 comprising two anaerobic reactor stages (AR1 and AR2) to produce treated water and biogas, a portion of which may be combusted in a gas turbine to generate power for the plant. Water treatment plant 100 treats up to 35 million liters of waste water per day. AR1 and AR2 supply pre-treated influent water to aeration basins and membrane bioreactor ("MBR") systems (AB1/MOS1 and AB2/MOS2). The anaerobic reactors treat raw influent water which is a combination of domestic effluent and industrial effluent received from a Kraft process pulp and paper mill through a dedicated waste line through a digestion process. This effluent or waste water has contaminant components as measured by a high biochemical oxygen demand ("BOD") and dissolved organic carbon ("DOC") content which provides a strong brown colouration to the waste water.

Figure 2:
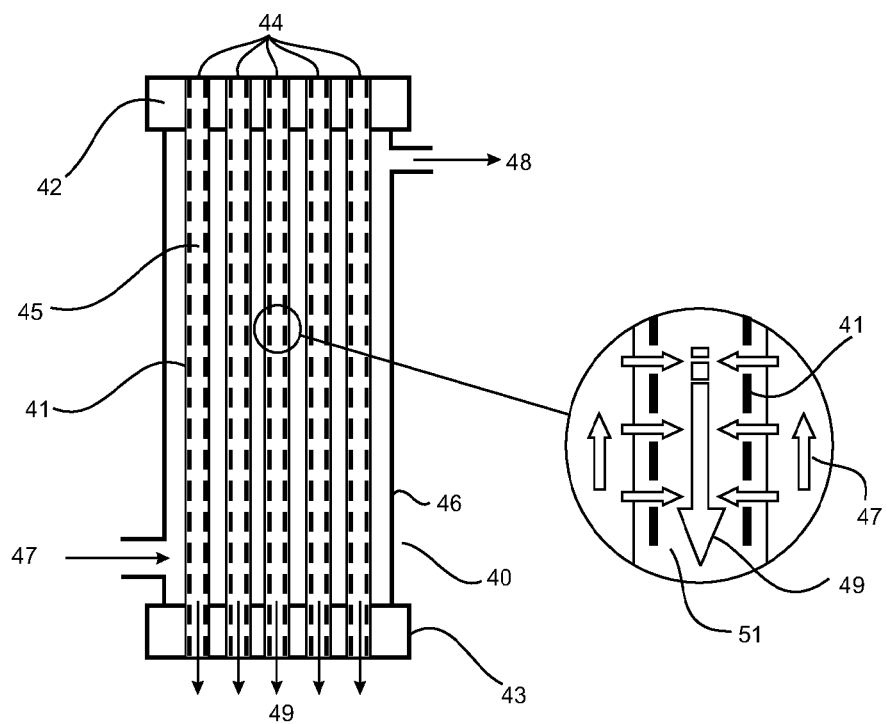
FIG. 2 is a schematic illustration of a membrane module used in an ultrafiltration stage of the water treatment plant of FIG. 1.

The treated effluent from the anaerobic reactor stages AR1 and AR2 passes to the aeration basins AB1 and AB2 respectively. These basins provide aerobic digestion conditions to further treat the waste water. The mixed liquor ("dirty water") is recirculated from aeration basins AB1 and AB2 into ultrafiltration ("UF") membrane operating systems MOS1 and MOS2 each of which includes a large number of membrane modules 40 as schematically illustrated in FIG. 2. Water treatment plant 100 could comprise a large number of such UF membrane operating systems (MOS) and several thousand membrane modules 40 for UF separation of the component represented by high BOD. The resulting ultrafiltrate or permeate has nearly undetectable levels of BOD. Each combined AB+MOS system comprises a membrane bioreactor ("MBR") and the ultrafiltrate may be referred to as MBR filtrate or permeate.

MBR permeate is directed to nanofiltration process unit 20 for removing DOC from the MBR permeate to produce a water quality acceptable for feed to reverse osmosis ("RO") process unit 30. The RO process unit 30 performs desalination (especially removing sulphate) and allows production of a water stream that may be recycled to the pulp and paper mill with benefit for the process economics of that mill.

FIG. 2 shows a schematic, referenced at http://www.separationprocesses.com/Membrane/MT_FigGen15.htm, of an ultrafiltration ("UF") membrane module 40 suitable for use in the MOS1 and MOS2 units. UF membrane module 40 is of hollow fibre type comprising a bundle 44 of hollow fibre membranes 41 accommodated within a pressurisable housing 46. Bundle 44 extends between two vertically opposed headers or pots 42 and 43 forming part of the module housing 46. Headers 42 and 43 are of epoxy resin. The opposite ends of each hollow fibre of bundle 44 are embedded and sealed within headers 42 and 43 respectively. The resulting design of membrane module 40 is analogous to a shell and tube heat exchanger with feed mixed liquor 47 entering the housing 46 (shell side) contacting the hollow fibre membranes 41 with "clean" water, essentially free of BOD, permeating the membranes 41 to enter the lumens 45 of membrane fibres to be recovered as a permeate stream 49. Water relatively concentrated in BOD is recovered as a retentate stream 48. The flow 51 of permeate stream 49 is counter-current to the flow of the feed mixed liquor 47 through the housing 46.

During typical daily (24 hour duration) operation of membrane modules 40, the bundle 44 of hollow fibre membranes 41 is subjected to about 110 filtration cycles in which permeate 49 is recovered, whilst corresponding pump means are operated, by suction from the hollow fibre membranes 41. Therefore, each filtration cycle, which imposes the cyclic stress above described, has a design duration of approximately 14 minutes. Following a filtration cycle, pump means is turned off during a relaxation cycle (also of 14 minute design duration). Sludge removal operations are conducted throughout this 14 minute cycle time, but particularly facilitated by the relaxation step, for example by agitating mixed liquor surrounding hollow fibre membranes 41 to shake the membranes and remove adherent sludge. The sludge so removed is typically carried away by a recirculation flow.

In a distinct testing cycle, performed at lesser frequency than filtration and relaxation cycles, the bundle 44 of hollow fibre membranes 41 is pressurised by compressed air in a cycle called a pressure integrity testing ("PIT") cycle or pressure decay testing ("PDT") cycle which also imposes a cyclic stress on the membrane modules 40. PIT or PDT testing is used to check whether hollow fibre membranes 41 leak. In a PIT/PDT test, hollow fibre membranes 41 are pressurised to a predetermined pressure (for example 105 kPa) with compressed air. Decay of the hollow fibre membrane 41 pressure with time indicates whether leaks exist in the hollow fibre membranes 41. Such leaks are impermissible since they compromise the extremely high mechanical disinfection, and reduction in biota (especially pathogenic bacteria and protozoa) which is required during a water treatment process.

The filtration and PIT/PDT cycles impose cyclic mechanical stresses on the membrane module 40. In particular, the headers 42 and 43 of epoxy or polyurethane resin are subjected to bending forces which will cause failure through stress cracking. When such cracking occurs, mixed liquor will mix with permeate and the membrane module 40 is no longer serviceable. Membrane module 40 must then be replaced. Whilst it is estimated that such failure will occur at a mean service life of about 5 years (approximately 200000 filtration cycles), there is considerable uncertainty over this and cost/capex budgeting for replacement of membrane modules is equally uncertain.

Figure 3:
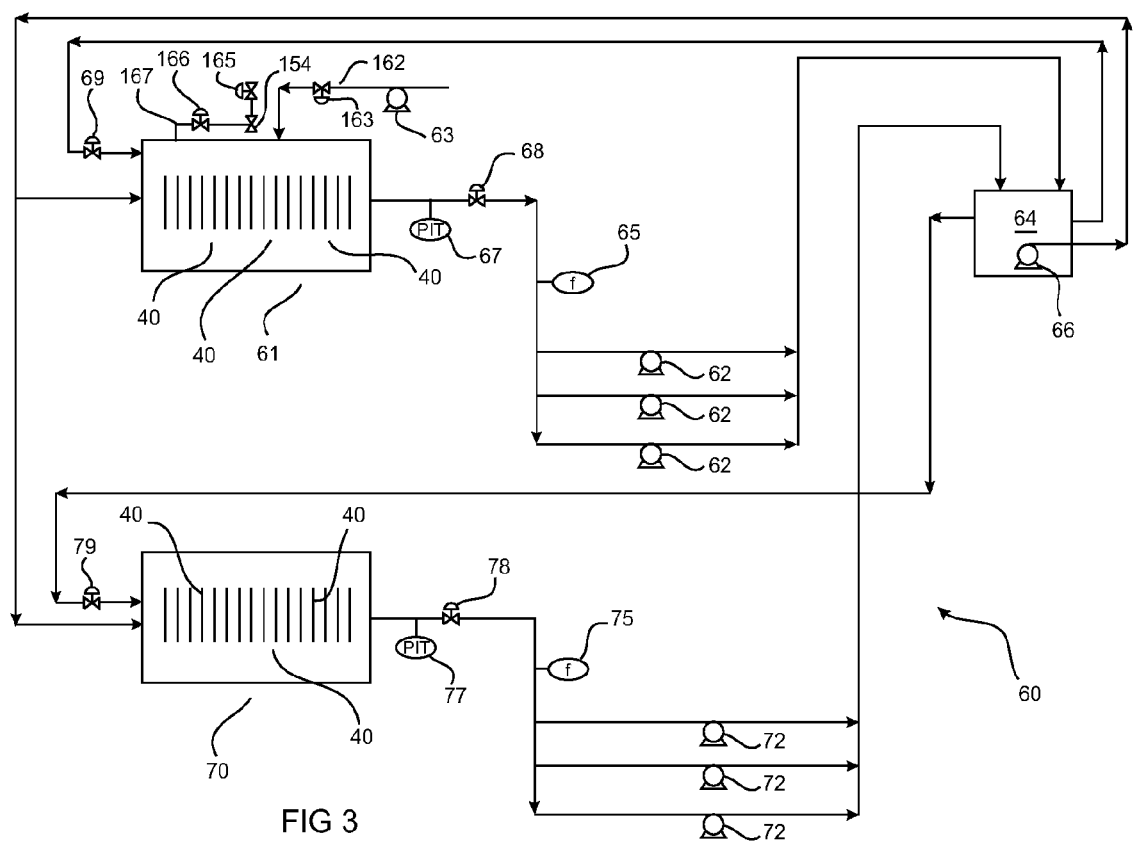
FIG. 3 is a process flow diagram for a test plant for testing membrane modules in accordance with the method of the present invention.
Figure 4:
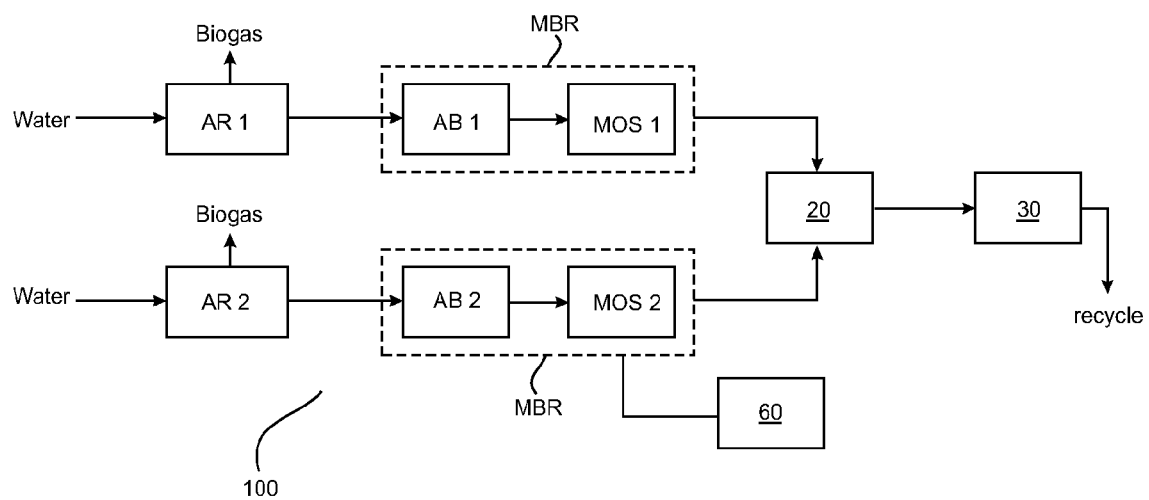
FIG. 4 is a schematic process flowsheet for a water treatment plant including a test plant for which the process flow diagram is provided as FIG. 3.

FIG. 3 shows schematic of a test plant 60, which—as shown in FIG. 4—forms part of an operating water treatment plant 100 located in Gippsland, Victoria, Australia. Water treatment plant 100 has capacity to treat a very high volume of aqueous effluent comprising domestic and industrial effluent (particularly pulp effluent from a Kraft paper mill) having different and time variant compositions, colour and temperature. For example, the domestic effluent contains relatively low levels of sulphate whereas the industrial effluent contains relatively high levels of sulphate and typically has a higher temperature.

The domestic and industrial effluents are mixed into a mixed liquor for treatment within the water treatment plant 100. Having test plant 60 forming part of operating treatment plant 100 enables testing of membrane modules 40 under industrial operating conditions. So, the results of testing are more reliable than tests performed distant from the water treatment plant 100, potentially on bench or very small scale, with effluents of constant rather than time variant quality.

The test plant 60 is controlled by the water treatment plant 100 control system (PLC/SCADA control system).

Test plant 60 is used for implementing failure testing protocols in which membrane modules 40 are subjected to cyclic stresses during a plurality of membrane operating cycles, each cycle being of significantly lesser duration than used for ultrafiltration using the MOS units; and testing the membrane modules 40 for component failure caused by said cyclic stresses. In particular, the stress cycles are imposed on the membrane modules 40 by the filtration (suction), relaxation and pressurisation cycles described above. Such testing allows a mean service life for the membrane module 40 to be predicted by acceleration mechanical stress testing in a period significantly less than estimated service life. Such information may be advantageously employed to assist in membrane module selection and cost budgeting for water treatment plant 100 and, in particular, the UF membrane operating systems (MOS units exemplified by MOS1 and MOS2).

Test plant 60 includes two test cells 61 and 70, each configured as a membrane bioreactor in which membrane modules 40 are submerged while conducting the membrane separation process. Each test cell 61, 70 is loaded with a rack of 16 membrane modules 40 for parallel testing, such testing involving ultrafiltration of mixed liquor for removal of BOD as described above. Simultaneous testing of a significant number of membrane modules 40 allows data acquisition to be accelerated further as sample size is increased and mean membrane module 40 service life can be predicted with greater accuracy. It is to be understood that membrane modules 40 are not expected to fail at the same time. Rather, different membrane modules 40 will have different endurance to stress cycles and fatigue failure and the output of testing is typically a statistical distribution of duration to failure, this statistical distribution having a mean duration to failure.

Test cell 61 comprises three filtrate pumps 62 operable in parallel dependent on the vacuum pressure that is required for the test cell 61. One or more filtrate pumps 62 are therefore used dependent on the required operating pressure. Higher suction pressures will require more of the pumping capacity to be used. Filtrate pumps 62 operate to draw UF permeate, at a temperature about 30° C., from a single rack of 16 membrane modules 40 located in test cell 61 during a filtration cycle. Filtrate is sent to test filtrate storage tank 64 A submersible pump 66 in the filtrate storage tank 64 returns filtrate back to the test cell 61 based upon liquid level in the filtrate storage tank 64. The required filtrate pumps 62 operate continuously. Filtrate flow is controlled by two actuated valves 68 and 69, conveniently of solenoid type.

Test cell 61 is also configured to enable pressure decay/pressure integrity ("PDT/PIT") testing, that is testing of the bundle 44 of hollow fibres for impermissible leaks as above described. To that end, air compressor 63 supplies compressed air through line 162 and automated control valve 163 to pressurise membrane modules 40 when required during a PDT/PIT test. Alternatively, compressed air may be supplied from the compressed air supply for water treatment plant 10.

Test cell 70 operates identically to test cell 61 except that it is configured, in accordance with membrane module 40 test strategy, not to perform PDT/PIT testing. Test cell 70 therefore subjects its rack of 16 membrane modules 40 to filtration and relaxation cycles only. Test cell 70 has three variable speed filtrate pumps 72 (of progressive cavity type) operable in parallel operable in parallel dependent on the vacuum pressure that is required for the test cell 70. One or more filtrate pumps 72 are therefore used, dependent on the required operating pressure, to draw filtrate from a single rack of 16 membrane modules 40 located in test cell 70 during a filtration cycle. Filtrate is sent to filtrate storage tank 74. Submersible pump 66 in the filtrate storage tank 64 returns filtrate back to the test cell 70 based upon liquid level in the filtrate storage tank 64. The required filtrate pumps 72 operate continuously with filtrate flow being controlled by two actuated valves 78 and 79, conveniently of solenoid type.

Expected filtrate flow range from each rack is in the range 7.5 to 25 $m^3/h$ and operating trans membrane pressure (TMP) during a filtration mode is 45 kPa. Filtrate flow range to test cell 60 or 70 via submersible pump 64 may be up to 50 $m^3/h$.

Test plant 60 may be operated, by way of example, as follows. Filtration test cycle duration for both test cells 60 may be pre-set at 10 seconds, this duration being very significantly less than the 14 minutes period required in normal service of water treatment plant 10. The filtration cycle duration is the duration for which filtrate pumps 62 and 74 draw filtrate from the rack of membrane modules 40. Filtrate pumps 62 and 74 are controlled to the pre-set duration for the filtration cycle. A filtration cycle is followed by a relaxation test cycle also having a pre-set duration. In this case, duration of the filtration and relaxation cycles are the same and set at 10 seconds for testing. This test cycle duration is purely by way of example but it is significantly less than the about 14 minute duration of filtration and relaxation cycles during normal service of MOS1 and MOS2 of the water treatment plant 100. Consequently, the frequency of stress cycles imposed on the membrane modules 40 is accelerated to frequency being very significantly greater than during normal service of MOS1 and MOS2 of water treatment plant 100.

During the filtration cycle (10 seconds duration for one test protocol), actuation valve 68 is open and actuation valve 69 is closed. The three filtrate pumps 62 are here operated to achieve a vacuum pressure of −45 kPa, measured and controlled by pressure transmitter 67. Flow is also measured by flow meter 65 but will not be the controlling parameter.

At the completion of the filtration cycle, actuation valve 69 will open and mixed liquor will be drawn from the filtration storage tank 64 during a relaxation cycle. 0.5 seconds later, actuation valve 68 will close. During the relaxation cycle (10 seconds duration for one test protocol), filtrate pumps 62 operate at the same speed as during the filtration cycle (that is pump speed remains on hold). A different speed control program for filtrate pumps 62 could be adopted.

At the completion of the relaxation cycle, actuation valve 68 will open and 0.5 seconds later, actuation valve 69 will close. The intention is that at no time are both actuation valves 68 and 69 closed and that when swapping from filtration to relaxation and back that for a short period of time both actuation valves 68 and 69 are open. This is required as filtrate pumps 62 are progressive cavity type. Further, the testing protocol is very aggressive by its nature and such short cycle times put significant pressure on valves and pumps as well as, potentially, on the membrane modules 40. Pressure shocks are quite likely in contrast with operating plant. These pressure shocks can be produced intentionally to increase the test severity, or can be minimised to reduce it down to a level more resembling normal operational pressure exposure. The test filtration and relaxation cycle times are therefore ideally to be selected to produce failure data that is relevant to predicting membrane module 40 service life and rather than failure data that results simply from the testing regime.

Test cell 61 is also configured for PDT/PIT testing. At a time determined by an operator of the test plant 60, filtrate pumps 62 are turned off and a PDT is performed by opening control valve 163 and admitting compressed air through line 162 for delivery to membrane modules 40. The PDT/PIT test mimics the test as required, by regulation, for MOS1 and MOS2 of water treatment plant 100. Compressed air is delivered to the membrane modules 40 for a pre-set pressurisation duration (60 seconds for one testing protocol) in order to pressurise the hollow fibre membranes 41. At completion of the pressurisation duration (60 seconds), provided that a sufficient start pressure is obtained, the PDT/PIT test begins. Control valve 163 is closed and drop in pressure of the hollow fibre membranes 41 is measured over 60 seconds. This duration is also for example only. Different durations could be selected for testing. The water treatment plant 10 control system (SCADA network) records the results. At conclusion of the PDT/PIT test, the test cell 61 may once again be returned to testing during filtration and relaxation cycles. However, test cell 61 could also be used simply to perform PDT/PIT tests to determine the influence of such testing on membrane module 40 fatigue failure. In this way, test plant 60 can test for the most likely cause of membrane module 40 failure, cyclic stresses due to filtration/relaxation cycles or cyclic stresses due to PDT/PIT testing or a combination of the two types of cyclic stress. If PDT/PIT testing is a cause of failure, this has implications for use of such testing in water treatment plant 100.

Test cell 61 is returned to filtration/relaxation testing following removal of air (typically though, due to the possibility of hollow fibre membrane 41 failure, not always) from the hollow fibre membranes 41 of membrane modules 40 (see FIG. 2). In order to do this, solenoid valve 165 is opened and service water passed through the venturi 164 to provide motive force. This differs from the protocol used in water treatment plant 100 where a compressed air supply is used to provide motive force to venturi(s) in MOS1 and MOS2. After a pre-set time, solenoid valve 166 is opened and a vacuum is applied to the hollow fibre membranes 41. This vacuum removes excess air and draws an air-liquid mixture into line 167. This air-liquid mixture is then discharged into test cell 61. After a pre-set duration (60 seconds for example), solenoid valves 165 and 166 are closed and test cell 61 is ready for restart of filtration/relaxation cycle stress testing.

Test cell 70 involves similar operation to test cell 61 except that PDT/PIT testing is not performed. Test cell 70 may be used to test membrane modules 40 with different filtration/relaxation cycle duration (say 20 seconds test cycle duration rather than 10 seconds) being used during testing. The actuating valves 78 and 79 are operated in the same manner as actuating valves 68 and 69. Pressure transmitter 77 takes the place of pressure transmitter 67 and flow meter 75 takes the place of flow meter 65.

An indicator of hollow fibre membrane 41 failure during filtration/relaxation cycle testing is increased turbidity downstream of test cells 61 and 70. Turbidity is therefore monitored as an indicator of possible failure. Membrane modules 40 can then be inspected to assess whether failure has occurred and location of any cracks in the membrane module headers ("pots") 42 and 43.

Tests may involve testing with waste waters at different temperatures. Though failure is less likely with domestic effluent water having temperature of 15-25° C., membrane module 40 testing in that temperature range may be conducted. Tests at higher temperature, and in particular in the temperature range 30-39° C. typical of conditions where the waste water contains waste water from the Kraft process pulp mill are also performed. Membrane operating cycle duration and frequency may be varied during testing dependent on waste water temperature.

Testing severity in test cells 61, 70 may also be increased by imposing various chemical treatments, for example sodium hypochlorite solutions typically used as disinfectants in water treatment processes, at a plurality of solution strengths, for varying durations so as to simulate the type of chemical attack and associated degradation that might occur during normal use over a period of years. Such chemical treatments could also be imposed in test cycles where the membrane operating cycle duration is the same as, or similar to, duration used in the operating plant.

Different membrane modules 40 will endure stress testing for differing periods. At the end of testing, a statistical distribution of number of fatigue failures of pots 42, 43 to time to failure can be obtained and a mean time to failure (equated to predicted service life because the number of test cycles to failure in testing plant (duration of 20 seconds=10 seconds filtration/10 seconds relaxation) can be compared with the about 200000 cycles equating with 5 years service (or 40000 cycles per year)) of a membrane module 40 predicted using conventional statistical techniques. A table showing conversion from testing duration to predicted service life is as follows:

TABLE 1

Conversion - Accelerated Testing Duration to Service Life

| Number of Cycles | Testing Duration (weeks) | Predicted Service Life (years) |
| --- | --- | --- |
| 50000 | 1.6 | 1.25 |
| 75000 | 2.4 | 1.88 |
| 100000 | 3.3 | 2.5 |
| 125000 | 4.1 | 3.1 |
| 150000 | 5.0 | 3.75 |
| 200000 | 6.6 | 5.0 |

As can be seen, mean service life can therefore be predicted in highly accelerated manner in 6 to 7 weeks using test plant 60 (based on 100% plant availability) rather than the 5 plus years it could take if membrane modules 40 are tested in normal service of water treatment plant 10. Such accelerated testing enables more confidence in membrane module 40 selection and budgeting for water treatment plant 100, particularly in terms of membrane module 40 replacement costs.

Test plant 60 may be used for other purposes. Above was described an extremely short filtration/relaxation cycle duration (10 seconds each for filtration and relaxation). Such extremely short cycle duration may impact either positively or negatively on membrane flux and membrane separation efficiency. Test plant 60 allows the effect of filtration/relaxation cycle duration on separation efficiency to be investigated.

Alternatively, or additionally, testing plant 60 may be used to assess whether resistance to membrane fouling is improved by shorter filtration cycle duration. Fouling is a significant problem in many membrane separation processes, particularly those used in waste water treatment, and most notably within membrane bioreactors. If filtration cycle duration can be used to improve resistance to fouling, and perhaps result in lowered usage of cleaning chemicals or other fouling treatments such as agitation and/or recirculation flow, this would also have benefits for water treatment plant 10 economics, either by permitting reduced initial capital investment, or enabling increased throughput capacity with relatively minor equipment modifications (fast acting valves, and more precise controls etc).

Modifications and variations to the method for accelerated testing of a membrane module described in this specification may be apparent to the skilled reader of this disclosure. Such modifications and variations are deemed within the scope of the present invention.

The invention claimed is:

1. A method for accelerated testing of a membrane module for resistance to cyclic stresses during operation of an industrial membrane separation process comprising loading at least one membrane module into a test cell of a test plant; conducting said industrial membrane separation process while subjecting said membrane module to cyclic stresses during a plurality of membrane operating cycles, each cycle being of significantly lesser duration than used for operation of said industrial membrane separation process in an operating plant; and testing said membrane module for component failure causing membrane module leaks caused by said cyclic stresses to predict membrane module service life.

2. A method of claim 1 wherein said test plant forms part of, or is connected to, an operating plant implementing said industrial membrane separation process.

3. A method of claim 1 wherein said testing allows a mean service life for the membrane module to be predicted in a much lesser timeframe than actual service life.

4. A method of claim wherein a frequency of membrane operating cycles applied during testing is significantly greater than a design frequency, the design frequency being a frequency at which stress cycles are applied to the membrane module in normal industrial service.

5. A method of claim 1 wherein said membrane operating cycles comprise filtration cycles; relaxation cycles; and/or pressure decay testing cycles in which the membranes of the membrane modules are tested for leaks.

6. A method of claim 1 wherein said membrane modules are only subjected to filtration and relaxation cycles; or pressure decay testing cycles.

7. A method of claim 1 wherein membrane modules are subjected to both filtration and relaxation cycles and pressure decay testing cycles.

8. A method of claim 6 wherein filtration cycles correspond with periods when pump means forming part of the test cell are turned on to apply pressure to a membrane; and relaxation cycles correspond with periods when said pump means forming part of the test cell are turned off.

9. A method of claim 1 wherein said testing plant includes a plurality of test cells.

10. A method of claim 9 wherein said test cells are operated in parallel with one test cell imposing different membrane operating cycles and a different cyclic stress regime on membrane modules than in another test cell.

11. A method of claim 5 wherein the frequency of filtration and relaxation cycles to which a membrane module is subjected during testing is accelerated to be significantly greater than the frequency of any pressure decay/pressure integrity testing cycles.

12. A method of claim 1 wherein said membrane module to be tested comprises a housing accommodating a bundle of hollow fibre membrane fibres, each hollow fibre extending between two opposed pots with the opposite ends of each hollow fibre being potted and sealed within said pots and component failure is indicated when cracking of a pot occurs during testing.

13. A method of claim 1 wherein a plurality or rack of membrane modules is loaded into the test cell to enable simultaneous testing.

14. A method of claim 1 wherein each membrane module is subjected to a testing cycle having a predetermined number of stress cycles to be imposed over a predetermined period of time, said predetermined number of stress cycles corresponding with required minimum design service life.

15. A method of claim 14 wherein said minimum design service life is measured in years and said predetermined number of stress cycles is imposed in a much shorter period in the order of weeks or months.

16. A method of claim 5 wherein duration of a filtration cycle is significantly shorter than during normal service.

17. A method of claim 16 wherein said significantly shorter filtration cycle duration increases filtration flux over normal service.

18. A method of claim 17 wherein filtration flux during testing is measured and compared with filtration flux during normal service.

19. A method of claim 5 wherein testing is used to assess whether resistance to membrane fouling is improved by shorter filtration cycle duration.

20. A method of claim 1 including imposing chemical treatments on the membrane module at a plurality of solution strengths for varying duration.

21. A method of claim 20 wherein said chemical treatments are imposed during membrane operating cycles having duration the same as, or similar to, duration in said operating plant.

22. A method of claim 1 wherein said industrial membrane separation process requires a membrane service life of duration of a plurality of years.

23. A method of claim 1 wherein said industrial membrane separation process is a liquid treatment process, preferably a water treatment process.

24. A method of claim 1 wherein said test cell is configured to simulate a membrane bioreactor with said membrane module being submerged in mixed liquor within said test cell.

25. A method of claim 23 wherein said water treatment process is a waste water treatment process where a membrane module will be subjected to an operating temperature greater than about 25° C., or even greater than 30° C.

26. A method of claim 25 where said membrane module comprises pots made of polymer material and said membrane module operating temperature is greater than the glass transition temperature of said polymer material.

27. A method of claim 23 wherein said testing method is applied at different temperatures to assess dependence of membrane module service life on service operating temperature.

28. A test plant for accelerated testing of a membrane module, wherein the test plant tests a membrane module for resistance to cyclic stresses by a method according to claim 1.

* * * * *